(12) United States Patent
Maggenti

(10) Patent No.: US 8,064,450 B2
(45) Date of Patent: Nov. 22, 2011

(54) SYSTEM AND METHOD FOR REGISTERING IP ADDRESS OF WIRELESS COMMUNICATION DEVICE

(75) Inventor: Mark Maggenti, Del Mar, CA (US)

(73) Assignee: QUALCOMM Incorporated, San Diego, CA (US)

( * ) Notice: Subject to any disclaimer, the term of this patent is extended or adjusted under 35 U.S.C. 154(b) by 1158 days.

(21) Appl. No.: 10/430,938

(22) Filed: May 6, 2003

(65) Prior Publication Data

US 2003/0206536 A1 Nov. 6, 2003

Related U.S. Application Data

(60) Provisional application No. 60/378,249, filed on May 6, 2002.

(51) Int. Cl.
*H04L 12/28* (2006.01)

(52) U.S. Cl. .................................. 370/392; 370/522

(58) Field of Classification Search .................. 370/310, 370/328, 338, 352, 353, 354, 355, 356, 392, 370/400, 401, 466, 467; 709/200, 227, 228, 709/238, 245, 246

See application file for complete search history.

(56) References Cited

U.S. PATENT DOCUMENTS

| | | | | |
|---|---|---|---|---|
| 5,117,352 A | * | 5/1992 | Falek | 714/4 |
| 5,623,601 A | | 4/1997 | Vu | |
| 5,650,825 A | * | 7/1997 | Naimpally et al. | 348/465 |
| 6,061,346 A | | 5/2000 | Nordman | |
| 6,128,298 A | | 10/2000 | Wootton et al. | |
| 6,128,664 A | | 10/2000 | Yanagidate et al. | 709/228 |
| 6,523,068 B1 | | 2/2003 | Beser et al. | 709/238 |
| 6,535,511 B1 | * | 3/2003 | Rao | 370/392 |
| 6,618,757 B1 | | 9/2003 | Babbitt et al. | 709/226 |
| 6,973,044 B1 | * | 12/2005 | Barach | 370/252 |
| 6,993,595 B1 | * | 1/2006 | Luptowski et al. | 709/245 |
| 2001/0017856 A1 | * | 8/2001 | Asokan et al. | 370/389 |

(Continued)

FOREIGN PATENT DOCUMENTS

CN 1216657 5/1999

(Continued)

OTHER PUBLICATIONS

International Preliminary Examination Report—PCT/US03/014163, IPEA—US, Mar. 2, 2005.

(Continued)

*Primary Examiner* — Seema S. Rao
*Assistant Examiner* — Leon Andrews
(74) *Attorney, Agent, or Firm* — Sandeep S. Minhais; Darren M. Simon

(57) ABSTRACT

A system and method for enabling a wireless communication device to register a temporary public IP address assigned to the device by a network access translation module, when the device is initially informed only of a private, non-routable IP address that has been assigned to it. In one embodiment, the device sends a "blind" registration message to an SIP server, with the private IP address of the device being translated to the public IP address by the NAT and with the SIP server registering the "originator" address in the header. In another embodiment, a registration server detects a message indicating the public IP address and sends the public IP address back to the device, so that the device can conventionally register the address with the SIP server.

20 Claims, 4 Drawing Sheets

U.S. PATENT DOCUMENTS

| | | | |
|---|---|---|---|
| 2002/0116523 A1* | 8/2002 | Warrier et al. | 709/238 |
| 2002/0152325 A1* | 10/2002 | Elgebaly et al. | 709/246 |
| 2003/0009561 A1* | 1/2003 | Sollee | 709/227 |
| 2003/0142642 A1* | 7/2003 | Agrawal et al. | 370/328 |
| 2008/0140848 A1* | 6/2008 | Christenson | 709/228 |

FOREIGN PATENT DOCUMENTS

| | | |
|---|---|---|
| CN | 1250578 | 4/2000 |
| JP | 2001-230951 | 8/2001 |
| JP | 2003-051842 | 2/2003 |
| JP | 2003-163700 | 6/2003 |
| JP | 2003-174466 | 6/2003 |
| WO | WO0176154 A2 | 10/2001 |
| WO | WO0193061 A1 | 12/2001 |
| WO | WO0203217 A1 | 1/2002 |

OTHER PUBLICATIONS

International Search Report—PCT/US03/014163, International Search Authority—US, Jun. 16, 2004.

* cited by examiner

SYSTEM AND METHOD FOR REGISTERING IP ADDRESS OF WIRELESS COMMUNICATION DEVICE

CROSS-REFERENCE TO RELATED APPLICATION

This application claims the benefit of priority of U.S. Provisional Patent Application Ser. No. 60/378,249, filed May 6, 2002, pending, which application is incorporated herein by reference.

I. FIELD OF THE INVENTION

The present invention relates generally to wireless communication devices that communicate in an IP-based infrastructure.

II. BACKGROUND OF THE INVENTION

Wireless communication devices, such as but not limited to wireless telephones that communicate using Code Division Multiple Access (CDMA) spread spectrum modulation techniques, communicate over the air with system infrastructure using wireless telephone over-the-air communication protocols, e.g., the CDMA protocols known as IS-95A and IS-2000. The system infrastructure, which can include base stations (BTS), base station controllers (BSC), and other components, connects the wireless telephone to another communication device, such as a through land line or another wireless communication system.

In the case of CDMA, voice data is sent over the air in packets that are collected by the infrastructure and assembled into a voice stream, transparently to the speakers who are talking to each other. As might be expected, the over-the-air protocol is tailored to optimize wireless communication. For instance, to maximize over-the-air capacity, the over-the-air protocol contains a minimum of signalling information, and the size of a voice data packet is relatively small.

With the growth of the Internet, computer-to-computer communication using Internet Protocols (IP) has become ubiquitous. Furthermore, it has become desirable not only to facilitate computer data communication using IP, but to facilitate voice communication using IP as well. As but one advantage afforded by using IP in a telephony infrastructure, much hardware such as switches can be eliminated, and existing computers and software can be used instead, reducing cost. To this end, so-called voice over IP (VOIP) has been introduced.

To support VOIP, a communication device must have, among other requirements, an IP address, so that the IP-based infrastructure knows where to send data and voice packets intended for the device. Typically, the IP address for a wireless device is not static, but rather one is assigned to a device upon power-up by a local network carrier from a pool of IP addresses assigned to the carrier. According to current protocol, the device registers its temporary IP address by sending a registration message through the Internet to an SIP server that is not necessarily associated with the local network carrier.

The present invention understands that for several reasons, many local networks assign internal IP addresses to their devices, with the internal IP addresses being routable only within the local network and not outside the system through the rest of the Internet. This might be done, e.g., because a system might be allocated a block that contains only a limited number of routable IP addresses, whereas it can define an almost unlimited number of internal IP addresses to allocate to its various devices for internal communication-only purposes.

To preserve system security by preventing non-system devices from learning about the local network's internal topology, which might otherwise be possible, and to provide a means by which a wireless communication device can communicate outside the local network (as is typically required to complete a VOIP communication path through the Internet), many local networks that employ internal-only addresses include an interface to the Internet referred to as a network access translation (NAT) component. Among other things, the NAT translates a device's internal IP address, sometimes referred to herein as a "private" IP address, to an Internet-routable IP address, sometimes referred to herein as a "public" IP address. It is to a device's public IP address that IP packets must be sent, and from a device's public IP address from which IP packets must appear to have originated.

However, as critically observed by the present invention, it is the public IP address—the one that is assigned by the NAT and that consequently is unknown to the device—that a device must register with the external SIP server. The present invention accordingly recognizes that a method must be provided for wireless communication devices in local networks such as described above to register their public, NAT-assigned IP addresses with an SIP server that is external to the local network. Moreover, the present invention understands that in preferred non-limiting embodiments the registration procedure should not necessarily require an additional proxy server located at the NAT interface, since this would be expensive and/or impractical in many cases and potentially not under the user's control.

SUMMARY OF THE INVENTION

A voice over Internet (VOIP) system includes a wireless communication device such as a CDMA telephone that has been assigned a private IP address that is known to the device. A local, preferably IP-based network communicates with the wireless communication device, and a network access translation (NAT) component communicates with the local network and with the Internet. The NAT component correlates the private IP address to a public IP address, i.e., the NAT component translates the private IP address to a public IP address in outgoing messages and the public IP address to the private IP address in incoming messages.

In accordance with one aspect of the present invention, a logic component generates an IP protocol-based message. The message includes a header that has, as a destination address, the public IP address associated with the device. The message also has a body containing either the public IP address, or, equivalently, data that indicates that the message is communicating to the device the public IP address in the header. The message can be received by the wireless communication device to inform the wireless communication device of the public IP address. The device subsequently sends a registration message to an SIP server to register the public IP address.

In another aspect, a method for registering a public IP address of a wireless communication device with an SIP server includes informing the wireless communication device of a private IP address of the device. The method further includes receiving a message from the wireless communication device and translating the private IP address to a public IP address. Then, the message is sent over the Internet and the public IP address detected. In response, an address message that is addressed to the public IP address is sent over the Internet to the wireless communication device, so that the wireless communication device is informed of the public IP address. A registration message can then be sent from the wireless communication device to a server over the Internet, with the registration message containing the public IP address of the wireless communication device.

In one implementation, the public IP address is contained in both a message header and message body of the address message. In another implementation, the public IP address is contained only in a message header of the address message, with the message body of the address message containing a pointer to the message header.

In still another aspect, a wireless communication device includes means for sending a message that is convertable to an IP message and that indicates a private IP address as an originator address. The device also includes means for receiving an address message indicating a public IP address of the wireless communication device. Means are provided for sending a registration message to register the public IP address in an IP-based system.

In yet another aspect, a voice over Internet (VOIP) system includes a wireless communication device, and a local network communicating with the wireless communication device. The local network, which can include IP infrastructure and a carrier, assigns a private IP address to the wireless communication device. A network access translation (NAT) component communicates with the local network and with the Internet, with the NAT component correlating the private IP address to a public IP address. In this embodiment, the wireless communication device generates a blind registration message indicating to an SIP server associated with the Internet to register a public IP address contained in a header of the blind registration message as assigned by the NAT component.

In another aspect, a method is provided for registering a public IP address of a wireless communication device having knowledge only of a private IP address. The message includes sending a registration message from the wireless communication device that indicates the private IP address as an originator IP address. The registration message is addressed to an IP-based server. The method further includes translating the private IP address in the message to a public IP address and then sending the message to the IP-based server. At the server, it is ascertained that the message is a registration message, such that the public IP address appearing as an originator IP address is registered as the IP address of the wireless communication device.

In one preferred, non-limiting implementation, the registration message includes a body having a field representing the public IP address, and the field is empty or null when received by the IP-based server. This indicates that the message is a blind registration message and that the originator address is to be registered. In another implementation, the registration message includes a body having a field with data therein other than the public IP address but indicating that the originator address in a header of the message is to be registered as an address of the wireless communication device.

In another aspect, a wireless communication device includes means for receiving a private IP address and means for generating a blind registration message requesting registration of a public IP address without listing the public IP address in the registration message. Means transmit the blind registration message over an over-the-air interface to an IP-based infrastructure and thence to a registering server.

The details of the present invention, both as to its structure and operation, can best be understood in reference to the accompanying drawings, in which like reference numerals refer to like parts, and in which:

DETAILED DESCRIPTION OF THE PREFERRED EMBODIMENT

Figure 1:
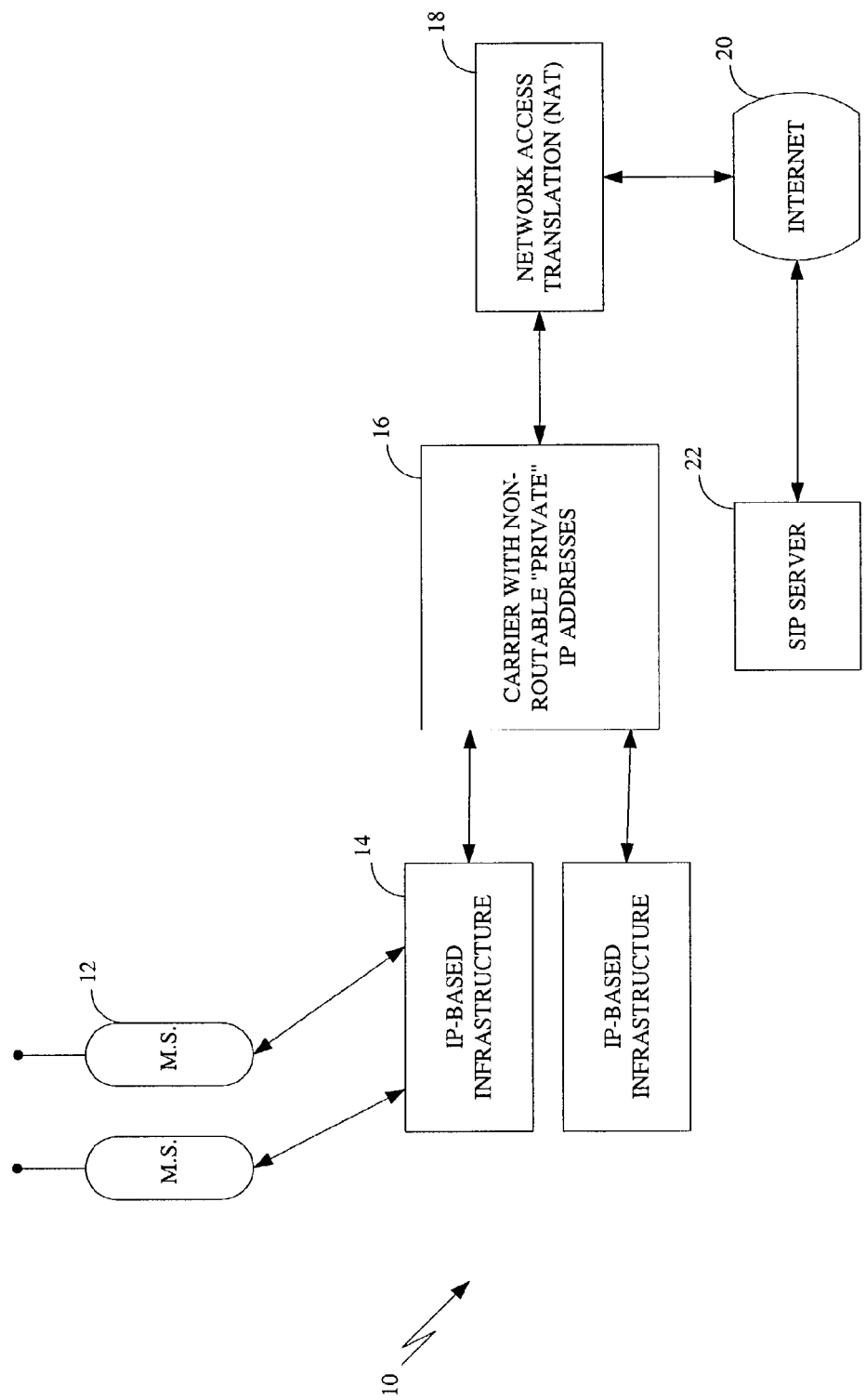
FIG. 1 is a block diagram of a first embodiment of the presently preferred wireless communication system.

Referring initially to FIG. 1, a system is shown, generally designated 10, for effecting communication between a target wireless communication device 12 (two devices 12 shown in FIG. 1) and a telephony infrastructure 14 that supports IP, including VOIP. In one non-limiting embodiment the device 12, also referred to as a "mobile station ("MS"), is a mobile telephone made by Kyocera, Samsung, or other manufacturer that uses Code Division Multiple Access (CDMA) principles and CDMA over-the-air (OTA) communication air interface protocols such as defined in but not limited to IS-95A, IS-95B, WCDMA, IS-2000, and others to communicate with the infrastructure 14, although the present invention applies to any wireless communication device.

For instance, the wireless communication systems to which the present invention can apply, in amplification to those noted above, include Personal Communications Service (PCS) and cellular systems, such as Analog Advanced Mobile Phone System (AMPS) and the following digital systems: CDMA, Time Division Multiple Access (TDMA), and hybrid systems that use both TDMA and CDMA technologies. A CDMA cellular system is described in the Telecommunications Industry Association/Electronic Industries Association (TIA/EIA) Standard IS-95. Combined AMPS and CDMA systems are described in TIA/EIA Standard IS-98. Other communications systems are described in the International Mobile Telecommunications System 2000/Universal Mobile Telecommunications Systems (IMT-2000/UM), standards covering what are referred to as wideband CDMA (WCDMA), cdma2000 (such as cdma2000 1× or 3× standards, for example) or TD-SCDMA.

The present invention applies to any wireless communication device 12; for illustration it will be assumed that the device 12 is a telephone 12. In general, wireless communication devices to which the present invention applies may include but are not limited to a wireless handset or telephone, a cellular phone, a data transceiver, or a paging and position determination receiver, and can be hand-held, or portable as in vehicle-mounted (including cars, trucks, boats, planes, trains), as desired. However, while wireless communication devices are generally viewed as being mobile, it is to be understood that the present invention can be applied to "fixed" units in some implementations. Also, the present invention applies to data modules or modems used to transfer voice and/or data information including digitized video information, and may communicate with other devices using wired or wireless links. Further, commands might be used to cause modems or modules to work in a predetermined coordinated or associated manner to transfer information over multiple communication channels. Wireless communication devices are also sometimes referred to as user terminals, mobile stations, mobile units, subscriber units, mobile radios or radiotelephones, wireless units, or simply as "users" and "mobiles" in some communication systems.

The infrastructure 14 can include one or more of a base station (BTS), base station controller (BSC), mobile switching center (MSC), gateway to a satellite system, and other infrastructure component. In any case, the infrastructure supports IP and attendant protocols or stack of IP protocols, including VOIP and Session Initiation Protocol (SIP).

The IP infrastructure 14 communicates with a local carrier 16 which can also support other infrastructures as shown. The carrier 16 can be implemented by an Internet Service Provider or other entity which can create or otherwise establish its own virtually unlimited number of private IP addresses, to be used only in the infrastructure 14 or infrastructures which are supported by the carrier 16. The private IP addresses can be established by another component if desired. Regardless, it is to be understood that the private addresses are generally not routable, i.e., are not recognized, by general purpose Internet components that are external to the below-described NAT.

FIG. 1 shows that the carrier 16 communicates with a network access translation (NAT) component 18, hereinafter "NAT" 18. Among other things, the NAT 18 assigns public IP addresses (i.e., addresses that are routable through the Internet in that they are recognized by general purpose Internet components) to devices that have been assigned private addresses by the carrier 16. Stated differently, the NAT 18 translates private IP addresses in the "from" or "originator" fields of message headers received from the carrier 16 to public IP addresses, and then forwards the translated messages on to the Internet 20. Also, the NAT 18 translates public IP addresses in the "to" or "destination" fields in message headers received from the Internet 20 to the corresponding private IP addresses, and then forwards the translated messages on to the carrier 16 for local network routing.

In accordance with IP principles, the communication device 12 must register its public address with an SIP server 22 that is external to the NAT 18 relative to the carrier 16 and that communicates with the Internet 20. The present invention provides the below-described methods for doing so.

With the above overview of the present architecture in mind, it is to be understood that the present logic is executed in accordance with the flow charts discussed below. Those skilled in the art will appreciate that the flow charts illustrate the structures of logic elements, such as computer program code elements or electronic logic circuits, that function according to this invention. Manifestly, the invention is practiced in its essential embodiment by a machine component that renders the logic elements in a form that instructs a digital processing apparatus (that is, a computer, controller, processor, etc.) to perform a sequence of function steps corresponding to those shown.

In other words, the logic may be embodied by a computer program that is executed by a processor or processors within one or more of the components shown as a series of computer- or control element-executable instructions. These instructions may reside, for example, in RAM or on a hard drive or optical drive, or the instructions may be stored on magnetic tape, electronic read-only memory, or other appropriate data storage device that can be dynamically changed or updated.

Figure 2:
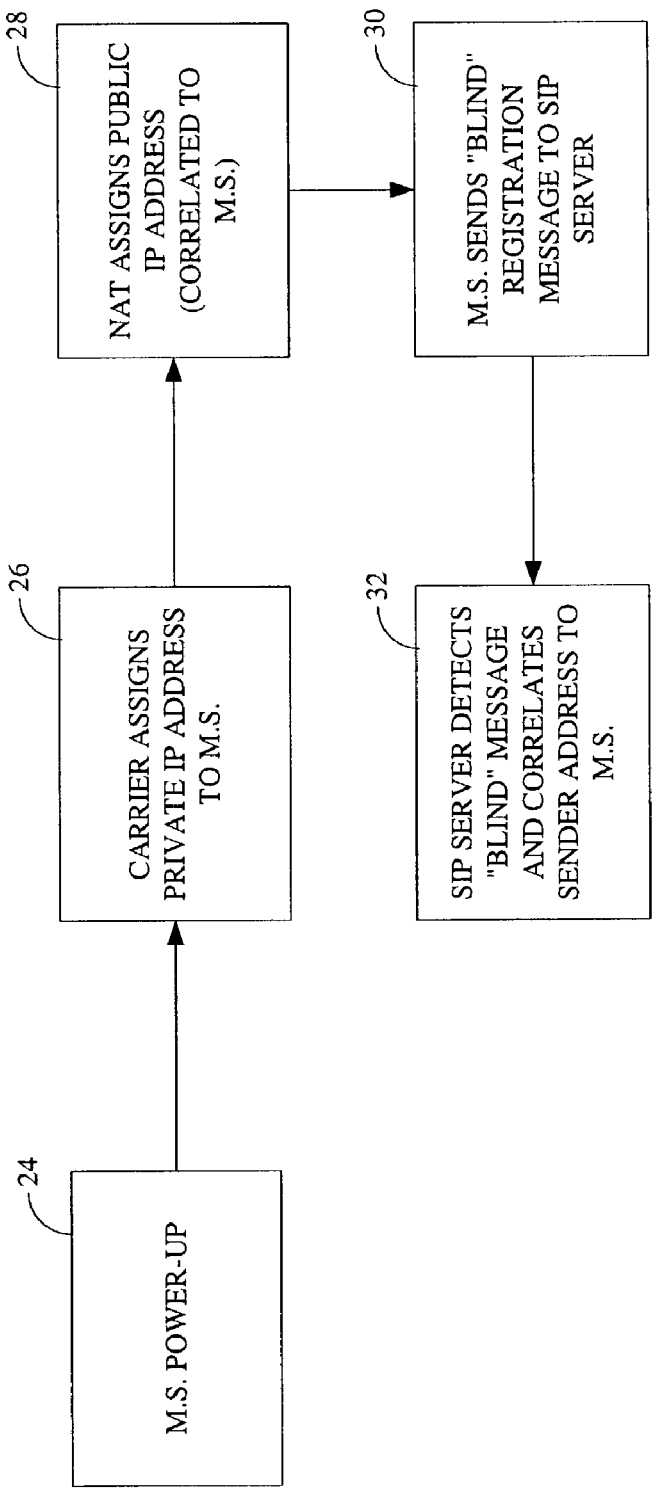
FIG. 2 is a flow chart of the logic undertaken in the architecture of FIG. 1.

Now referring to FIG. 2, the logic that is executed in the system 10 shown in FIG. 1 can be seen. Specifically, commencing at block 24, the communication device 12 (referred to in the drawings as "mobile station") powers up or otherwise indicates that it is configured to send and/or receive voice and/or data information using the IP infrastructure 14. In response, it is assigned a temporary private IP address by the carrier 16 at block 26.

Moving to block 28, the NAT 18 assigns a temporary public IP address to the communication device 12 by, e.g., correlating the private IP address of the device 12 with one of a block of public IP addresses that have been allocated to the NAT 18. Proceeding to block 30, the communication device 12 then sends a "blind" registration message addressed to the SIP server 22 to register its public IP address therewith. The registration message is "blind" in that the device 12 does not necessarily know its public IP address, and so the device 12 can leave the "IP address to be registered" field blank in an otherwise conventional SIP registration message. In this embodiment, the SIP server 22 is programmed to regard a blank "IP address to be registered" field as an instruction to register, as the address of the device 12, the public IP address in the "from" or "originator" field in the header of the message, as received from the NAT 18. Or, instead of using a blank "IP address to be registered" field as an indicator that a blind registration is being executed, a new type of SIP message can be implemented, in which the SIP server 22 is informed by data in the message body to register the public IP address in the "from" or "originator" field in the header of the message. In either case, it is indicated to the SIP server 22 that what is to be registered is the public IP address in the "from" or "originator" field in the header of the message.

Figure 3:
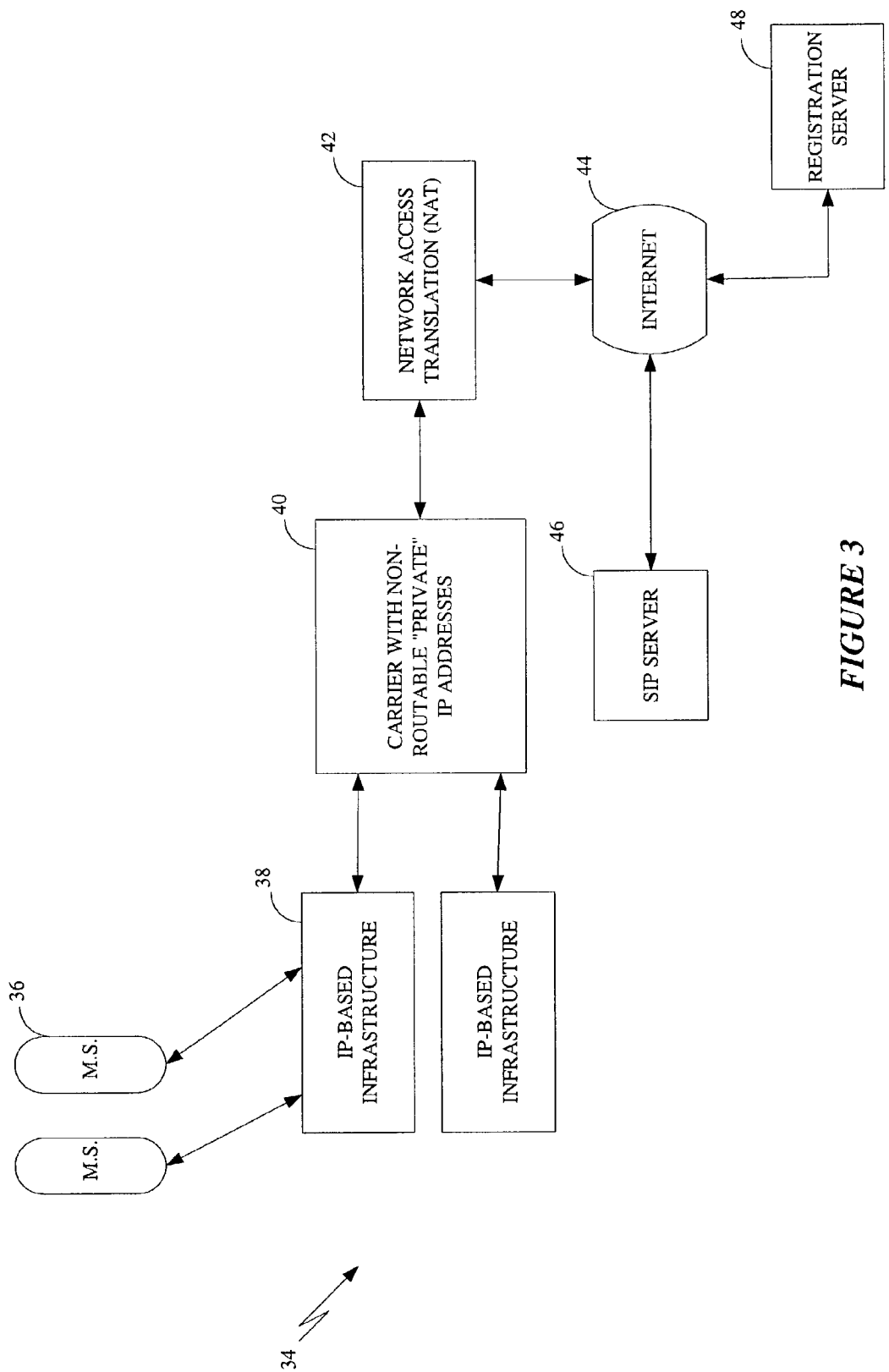
FIG. 3 is a block diagram of a second embodiment of the presently preferred wireless communication system.
Figure 4:
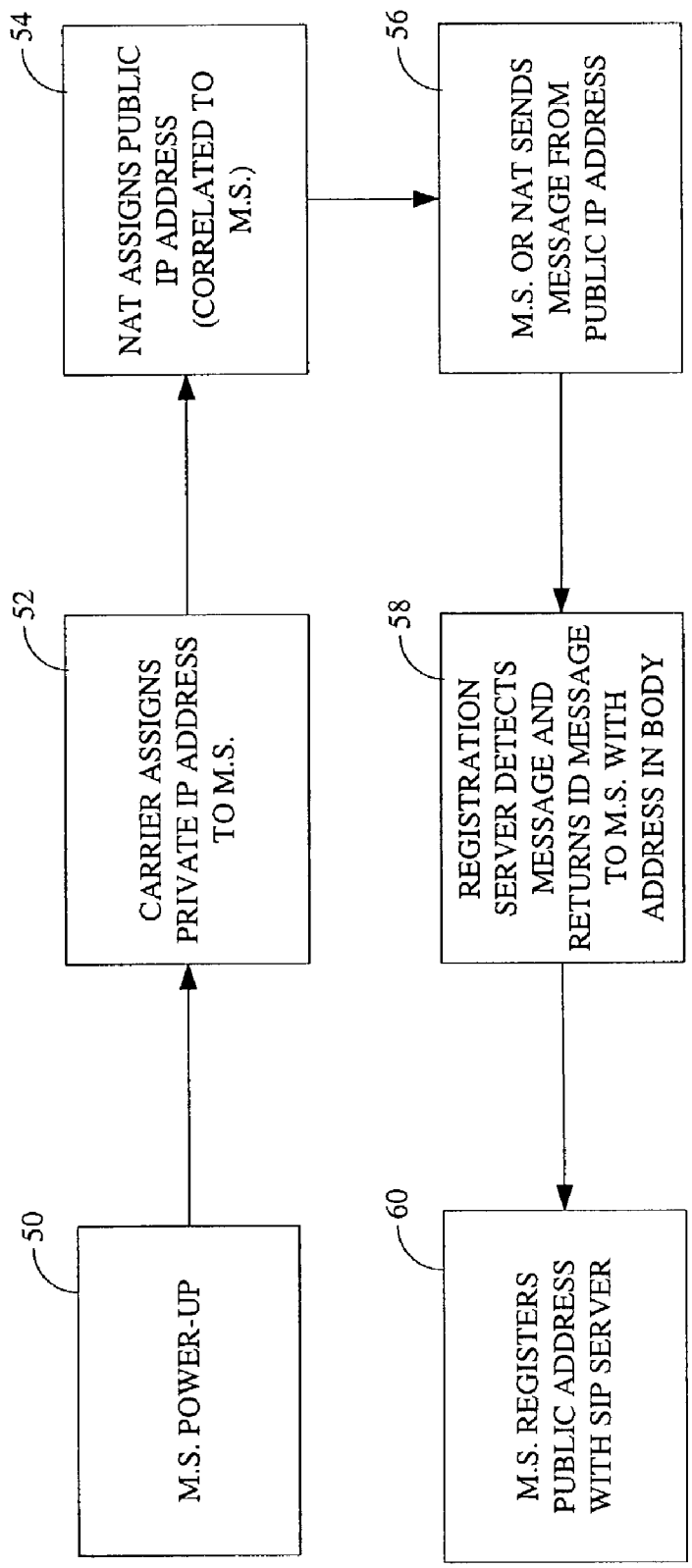
FIG. 4 is a flow chart of the logic undertaken in the architecture of FIG. 3.

FIGS. 3 and 4 illustrate an alternate embodiment. The architecture shown in FIG. 3 is substantially identical to that shown in FIG. 1, except that a hardware-implemented or software-implemented registration server is provided. Specifically, a system 34 is shown in FIG. 3 which includes one or more wireless communication devices 36, IP infrastructure 38, a carrier 40, and NAT 42 which communicates with the Internet 44. Public IP addresses are registered at an SIP server 46. To facilitate this registration, a registration server 48 communicates with the Internet 44.

FIG. 4 shows the logic that is at least partially implemented by the registration server 48. Commencing at block 50, the communication device 12 powers up or otherwise indicates that it is configured to send and/or receive voice and/or data information using the IP infrastructure 38. In response, it is assigned a temporary private IP address by the carrier 40 at block 52. The NAT 42 assigns a temporary public IP address to the communication device 12 at block 54.

Proceeding to block 56, the communication device 36 (or the NAT 42 on its behalf) sends an IP message. Recall that the NAT 42 translates the originator's private IP address to a public IP address, so that the message sent to the Internet appears to be sent from the public IP address.

Moving to block 58, the registration server 48 detects the message. In response, the registration server 48 generates a message addressed to the public IP address, i.e., the server 48 generates a message that has, in the "to" or "destination" field of the message header, the public IP address of the communication device 12 as assigned by the NAT 42. Additionally, the body of the message contains the public IP address in a field that is recognized as a "this is your public IP address" field by the communication device 36. Alternatively, the body of the message can contain a pointer to the destination address in the header or other data indicating that the message is communicating to the device 36 the public IP address that is in the destination field of the header.

In any case, the message is sent back to the device 36 over a path at least a portion of which includes publicly-accessible portions of the Internet. The device 36 receives the message, determines the public IP address that has been assigned to it by the NAT 42 as indicated in the message, and then sends a conventional SIP registration message to the SIP server 46 at block 60 containing the public IP address.

Below is an exemplary non-limiting perl program that implements the above-described logic of FIG. 4.

```
#! /usr/bin/perl
use Socket;
# Print help if no command line arguments
  if($#ARGV<0) {
    print STDERR "\n Usage: prpobe port \n";
    exit
  }
# Get port from command line
  $□port=$ARGV[0];
  $len = 1600;
# open socket
  $proto = getprotobyname('udp');
  socket(FS, PF_INLET, SOCK_DGRAM,$proto) or die "socket: $!";
# local addresses
  $□paddr = sockaddr_in($□port,INADDR_ANY
  bind(FS,$□paddr) or die "bind: $!";
  while(1) {
    ($rpaddr = recv(FS,$response,$len,0) or die "recv: $!";
    (port,$riaddr) '2 socketaddr_in($rpaddr);
    $ip=inet_ntoa($riaddr);
    $response="$ip;$port";
  # send reply
    defined (send(FS, $response,$rpaddr)) or die "send $send:
        $!";
  }
  close (FS);
```

While the particular SYSTEM AND METHOD FOR REGISTERING IP ADDRESS OF WIRELESS COMMUNICATION DEVICE as herein shown and described in detail is fully capable of attaining the above-described objects of the invention, it is to be understood that it is the presently preferred embodiment of the present invention and is thus representative of the subject matter which is broadly contemplated by the present invention, that the scope of the present invention fully encompasses other embodiments which may become obvious to those skilled in the art, and that the scope of the present invention is accordingly to be limited by nothing other than the appended claims, in which reference to an element in the singular is not intended to mean "one and only one" unless explicitly so stated, but rather "one or more". All structural and functional equivalents to the elements of the above-described preferred embodiment that are known or later come to be known to those of ordinary skill in the art are expressly incorporated herein by reference and are intended to be encompassed by the present claims. Moreover, it is not necessary for a device or method to address each and every problem sought to be solved by the present invention, for it to be encompassed by the present claims. Furthermore, no element, component, or method step in the present disclosure is intended to be dedicated to the public regardless of whether the element, component, or method step is explicitly recited in the claims. No claim element herein is to be construed under the provisions of 35 U.S.C. §112, sixth paragraph, unless the element is expressly recited using the phrase "means for" or, in the case of a method claim, the element is recited as a "step" instead of an "act".

What is claimed is:

1. A method for network communication, comprising:
  generating a session initiation protocol ("SIP") registration message by a communication device, the SIP registration message includes a header and a body,
  wherein the header of the SIP registration message includes an origination address field that stores an address associated with the communication device, and
  wherein the body of the SIP registration message includes a blank origination address field;
  wherein the blank origination address field indicates to a SIP server that an address stored in the origination address field in the header of the SIP registration message is to be registered by the SIP server as a public address identifying the communication device; and
  transmitting the SIP registration message to the SIP server.

2. The method of claim 1, further comprising obtaining a private IP address being associated with the communication device.

3. The method of claim 2, further comprising storing the private IP address into the origination address field in the header of the SIP registration message.

4. The method of claim 1, wherein the communication devices is a wireless communication device.

5. A communication system, comprising:
  a processor configurable to generate a session initiation protocol ("SIP") registration message, the SIP registration message includes a header and a body,
  wherein the header of the SIP registration message includes an origination address field that stores an address associated with the communication device, and
  wherein the body of the SIP registration message includes a blank origination address field;
  wherein the blank origination address field indicates to a SIP server that an address stored in the origination address field in the header of the SIP registration message is to be registered by the SIP server as a public address identifying the communication device; and
  a transmitter operable to transmit the SIP registration message to the SIP server.

6. The system of claim 5, wherein the processor is further configurable to obtain a private IP address being associated with the communication system.

7. The system of claim 6, wherein the processor is further configurable to store the private IP address into the origination address field in the header of the SIP registration message.

8. The system of claim 5, wherein the communication devices is a wireless communication device.

9. A non-transitory computer-readable medium having a computer program comprising:
  computer executable instructions for generating a session initiation protocol ("SIP") registration message, the SIP registration message includes a header and a body,
  wherein the header of the SIP registration message includes an origination address field that stores an address associated with the communication device, and
  wherein the body of the SIP registration message includes a blank origination address field;
  wherein the blank origination address field indicates to a SIP server that an address stored in the origination address field in the header of the SIP registration message is to be registered by the SIP server as a public address identifying the communication device; and
  computer executable instructions for transmitting the SIP registration message to the SIP server.

10. The non-transitory computer-readable medium of claim 9 further comprising computer executable instructions for obtaining a private IP address being associated with the communication devices.

11. The non-transitory computer-readable medium of claim 10 further comprising computer executable instructions for to storing the private IP address into the origination address field in the header of the SIP registration message.

12. The non-transitory computer-readable medium of claim 9, wherein the communication devices is a wireless communication device.

13. A method for providing packet data services, comprising:
receiving a session initiation protocol ("SIP") registration message from a communication device, the SIP registration message includes a header and a body,
wherein the header of the SIP registration message includes an origination address field that stores an address associated with the communication device, and
wherein the body of the SIP registration message includes a blank origination address field that indicates to a SIP server that an address stored in the origination address field in the header of the SIP registration message is to be registered by the SIP server as a public address identifying the communication device;
determining the content of the origination address field in the body of the SIP registration message; and
upon determining that the body of the SIP registration message includes a blank origination address field, registering the address stored in the origination address field in the header of the SIP registration message as a public address identifying the communication device.

14. The method of claim 13, further comprising
upon determining that the body of the SIP registration message includes an address associated with the communication device, registering said address as a public address identifying the communication device.

15. The method of claim 13, wherein the communication devices is a wireless communication device.

16. A system for providing packet data services, comprising:
a receiver operable to receive a session initiation protocol ("SIP") registration message from a communication device, the SIP registration message includes a header and a body,
wherein the header of the SIP registration message includes an origination address field that stores an address associated with the communication device, and
wherein the body of the SIP registration message includes a blank origination address field that indi-
cates to a SIP server that an address stored in the origination address field in the header of the SIP registration message is to be registered by the SIP server as a public address identifying the communication device;
a processor configurable
to determine the content of the origination address field in the body of the SIP registration message; and
upon determining that the body of the SIP registration message includes a blank origination address field, to register the address stored in the origination address field in the header of the SIP registration message as a public address identifying the communication device.

17. The system of claim 16, wherein the processor is further configurable upon determining that the body of the SIP registration message includes an address associated with the communication device, to register said address as a public address identifying the communication device.

18. The system of claim 16, wherein the communication devices is a wireless communication device.

19. A non-transitory computer-readable medium having a computer program comprising:
computer executable instructions for receiving a session initiation protocol ("SIP") registration message from a communication device, the SIP registration message includes a header and a body,
wherein the header of the SIP registration message includes an origination address field that stores an address associated with the communication device, and
wherein the body of the SIP registration message includes a blank origination address field that indicates to a SIP server that an address stored in the origination address field in the header of the SIP registration message is to be registered by the SIP server as a public address identifying the communication device; and
computer executable instructions for
determining the content of the origination address field in the body of the SIP registration message, and
upon determining that the body of the SIP registration message includes a blank original address field, registering the address stored in the origination address field in the header of the SIP registration message as a public address identifying the communication device.

20. The non-transitory computer-readable medium of claim 19, further comprising computer executable instructions for
upon determining that the body of the SIP registration message includes an address associated with the communication device, registering said address as a public address identifying the communication device.

* * * * *